United States Patent [19]
Leising et al.

[11] Patent Number: 5,833,572
[45] Date of Patent: Nov. 10, 1998

[54] TORQUE MANAGEMENT FOR GARAGE SHIFTS

[75] Inventors: Maurice B. Leising, Clawson; David Parenti, Auburn Hills, both of Mich.

[73] Assignee: Chrysler Corporation, Auburn Hills, Mich.

[21] Appl. No.: 851,288

[22] Filed: May 5, 1997

[51] Int. Cl.⁶ .................................................. B60K 41/04
[52] U.S. Cl. .......................................... 477/113; 477/102
[58] Field of Search ..................................... 477/101, 102, 477/103, 105, 106, 115, 116, 107, 110, 111, 112, 113

[56] References Cited

U.S. PATENT DOCUMENTS

| | | | |
|---|---|---|---|
| 4,222,292 | 9/1980 | Will et al. ............................... | 477/116 |
| 4,665,777 | 5/1987 | Kikuchi et al. ..................... | 477/116 X |
| 5,109,818 | 5/1992 | Yoshida .................................... | 123/319 |
| 5,265,498 | 11/1993 | Fodale et al. . | |
| 5,320,000 | 6/1994 | Marusue et al. ......................... | 477/154 |
| 5,373,821 | 12/1994 | Nishi et al. ........................... | 477/102 X |
| 5,403,246 | 4/1995 | Umemoto ................................ | 477/101 |
| 5,668,727 | 9/1997 | Pellerito et al. ..................... | 477/101 X |
| 5,679,093 | 10/1997 | Desautels et al. ...................... | 477/109 |

FOREIGN PATENT DOCUMENTS

| | | | |
|---|---|---|---|
| 92/05973 | 4/1992 | WIPO .................................... | 477/116 |

*Primary Examiner*—Charles A. Marmor
*Assistant Examiner*—Scott Lund
*Attorney, Agent, or Firm*—Mark P. Calcaterra

[57] ABSTRACT

A torque management apparatus for an automatic transmission of an internal combustion engine. The apparatus includes a sensor for sensing shifting of the transmission to a Neutral mode. An engine limiting means is operatively connected to a sensor for limiting the speed of the engine in response to the sensor, which senses the shifting of the transmission into or from the Neutral mode. Also, an engine delimiting means is operatively connected to the sensor and to the engine limiting means for returning the engine to a normal throttle speed in response to shifting of the transmission out of the Neutral mode. The engine limiting means and the engine delimiting means minimize stress on the transmission due to the engagement and disengagement of the transmission components caused by the shifting of the transmission in and out of a Neutral mode.

18 Claims, 7 Drawing Sheets

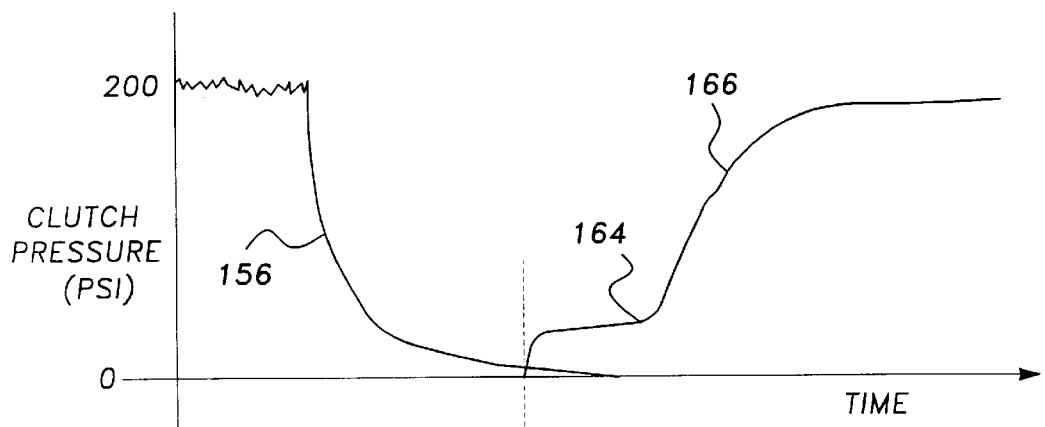
Fig-6
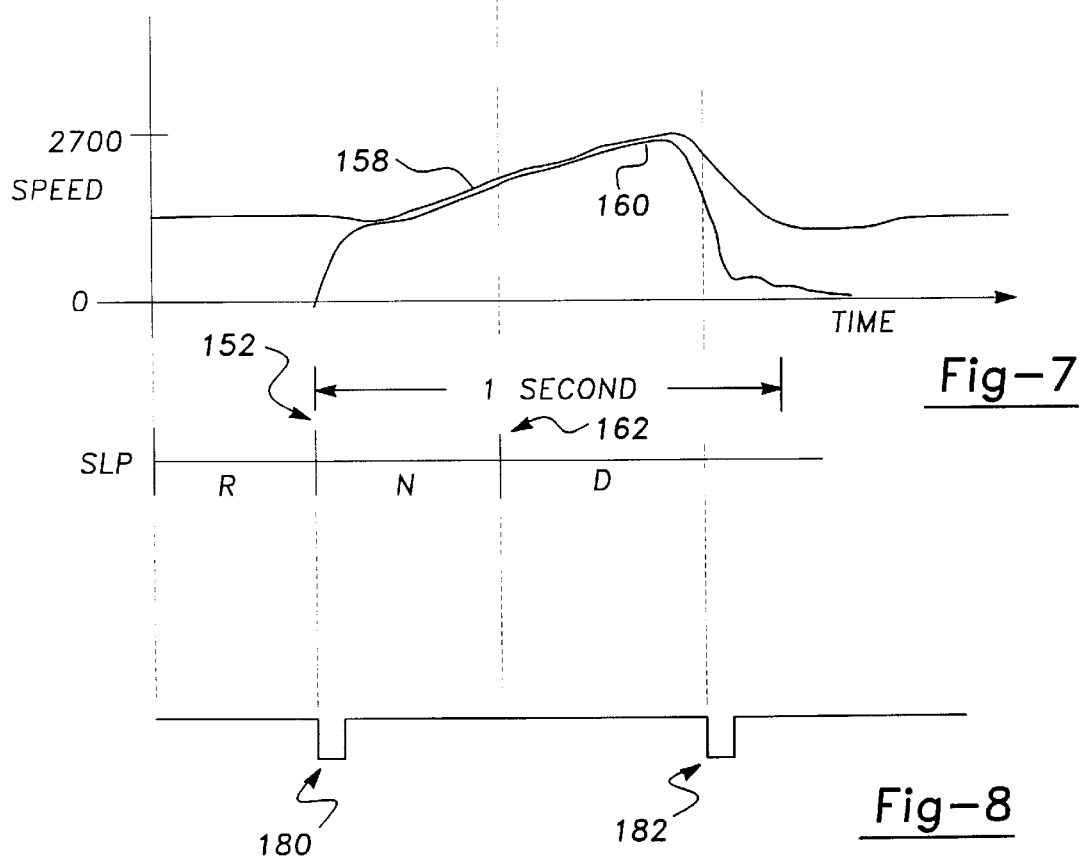
Fig-7
Fig-8

TORQUE MANAGEMENT FOR GARAGE SHIFTS

BACKGROUND OF THE INVENTION

1. Technical Field

The present invention relates generally to motor vehicle spark ignited internal combustion engine transmissions and, in particular, to a method and apparatus for utilizing engine and transmission data to reduce stress on motor vehicle driveline components during shifts from Neutral.

2. Discussion

The conventional motor vehicle automatic transmission includes a torque converter that connects the gear train to the vehicle engine, and an automatic gear box including a clutch for selectively engaging and disengaging the torque converter with the transmission driveshaft in response to the position of a shift lever element. When the shift lever element is moved into a Reverse or a Drive mode, the gear box clutch engages and transfers torque from the engine to the drivetrain. When the shift lever is moved into a Neutral mode, the gear box clutch disengages and allows the torque converter to rotate freely at engine speed independent of any load placed on it by the transmission.

A common problem associated with an automatic transmission occurs when the vehicle operator shifts the shift lever through Neutral while attempting to go from Forward to Reverse or Reverse to Forward as in a "rocking" maneuver that is used to free a car that stuck in snow or mud. During the shift through Neutral, the input clutch disengages, thereby allowing the torque converter turbine to rotate at an increased speed approaching that of the engine. Since the throttle may be open, engine speed increases simultaneously. However, as the transmission is shifted from this Neutral position into Reverse or Drive, the turbine must be slowed for engagement with the transmission/driveline/wheels. Therefore, the clutch must pull the turbine, and thereby the engine, down to a transmission-engaging speed. As a result, the clutch must dissipate the energy generated by slowing down the turbine to the engaging level. This engagement of the turbine at high engine speeds thus places a great deal of heat and stress on the clutch, as well as other driveline components, and reduces the overall life of the clutch.

Typical conditions causing the above-mentioned higher than normal engine speeds include the occurrence of a rock cycle, when the transmission is shifted rapidly between Reverse and Drive modes, thereby causing the transmission to be in a Neutral mode with the throttle open. Other such instances when engine speed is increased in Neutral include a Neutral dump mode, such as when the transmission is in Neutral and the throttle is increased, before the transmission is shifted into a Reverse or Drive mode. All shifts from Neutral to a Drive condition, either Forward or Reverse, are commonly referred to as garage shifts.

Over a period of time, the occurrence of the above mentioned garage shifts with increased throttle add stress to the transmission differential, the vehicle axles, the vehicle tires, and other driveline components, as well as the clutches. Therefore, it would be desirable to provide a system and method for reducing stress on the transmission clutches and other driveline components by reducing engine speed during occurrences of open-throttle garage shifts until the clutch is fully engaged, thereby reducing the clutch heat dissipation necessary to pull the torque converter turbine down to an engaging speed as the transmission is shifted from a Neutral mode to a Forward or Reverse Drive mode.

SUMMARY OF THE INVENTION

In accordance with the teachings of the present invention, a system and method for reducing stress on a motor vehicle engine, transmission and its associated driveline components upon sensing of predetermined transmission conditions associated with open-throttle garage shifts is provided. The present invention reduces or limits the increase in engine speed upon the occurrence of an open-throttle garage shift, such as a Neutral dump or a rock cycle, to thereby minimize the amount of heat that must be dissipated by the clutch in reducing the speed of the torque converter turbine to a transmission/driveline/wheel-engaging level.

In particular, the present invention provides a torque management apparatus for an automatic transmission of an internal combustion engine. The apparatus includes a sensor or means for sensing that the transmission is in a Neutral mode. An engine limiting means is operatively connected to a sensor or sensing means for limiting the speed of the engine in response to the sensor or sensing means, which senses that the transmission is in the Neutral mode. Also, an engine delimiting means is operatively connected to the sensor or sensing means and to the engine limiting means for returning the engine to a normal throttle speed in response to shifting of the transmission out of the Neutral mode. The engine limiting means and the engine delimiting means minimize stress on the transmission due to the engagement of the transmission components caused by the shifting of the transmission out of the Neutral mode.

BRIEF DESCRIPTION OF THE DRAWINGS

FIG. 6 graphically illustrates clutch pressure versus time for an engine system in which the torque management system of the present invention is implemented;

FIG. 7 graphically illustrates engine and turbine speed for an engine system in which the torque management system of the present invention is implemented;

FIG. 8 is a timing diagram for a torque management system of the present invention that also utilizes data from a transmission controller;

DETAILED DESCRIPTION OF THE PREFERRED EMBODIMENT

Figure 1:
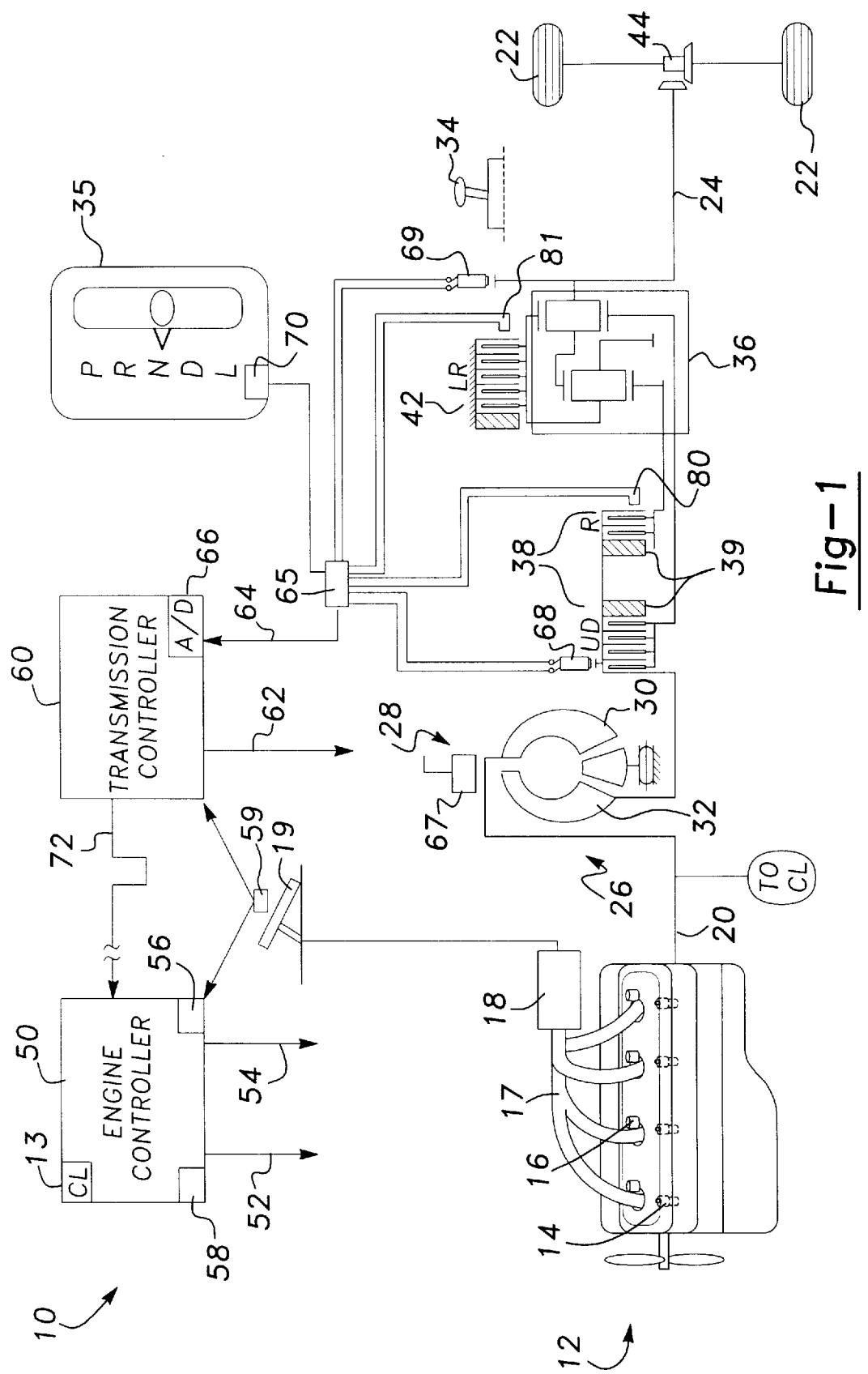
FIG. 1 is a block diagram of the powertrain system in which the present invention is implemented.

Referring now to the drawing figures, a diagram of the powertrain system in which the torque management system of the present invention is implemented is shown generally at 10. The system 10 includes an engine 12 which is a conventional, four stroke cycle, spark ignited internal combustion engine of the type well known in the art. However, the engine may also be any other type of internal combustion or diesel engine of the type typically implemented with an automatic transmission. The engine 12 includes a clock 13 (in controller for timing purposes) associated with the present invention, and spark plugs, such as the spark plug 14. Each spark plug has an associated spark timing for burning a fuel/air mixture introduced into engine cylinders (not shown) through inlet valves (not shown) controlled by fuel injectors, shown at 16. The engine also includes an intake manifold 17 that supplies air to the engine to create the fuel/air mixture. The amount of the fuel/air mixture is controlled by the engine throttle 18, which in turn is controlled by depression of an accelerator pedal 19. Engine power generated by the burned fuel is transferred to an engine crankshaft 20. The engine crankshaft 20 transfers this power to the wheels 22 of the motor vehicle via the driveshaft 24. This transfer of power is controlled through selective engagement of the motor vehicle transmission, which is shown generally at 26 and which will now be described.

Still referring to FIG. 1, the transmission 26 is an automatic transmission of the type well known in the art. The transmission 26 includes a torque converter shown generally at 28. The torque converter includes an impeller 30 connected to and driven by the crankshaft 20. The torque converter also includes a turbine 32 that receives rotational energy from the impeller through hydraulic power transmitted by the transmission fluid as well known in the prior art. Through manipulation of a shift lever 34 into the various transmission modes, such as Park, Reverse, Neutral and Drive indicated generally by a shift lever face plate 35 in FIG. 2, a gearbox 36, in combination with input clutches 38 having an associated volume of fluid for causing engagement of clutch plates 39 as is well known in the art, controls selective engagement of a reaction clutch 42. When the clutches are engaged, the torque converter transfers power from the crankshaft 20 impeller, through the turbine, through one of the input clutches 38 and a reaction clutch 42 to the driveshaft 24. The driveshaft in turn transfers power through a differential 44 to the wheels 22.

Still referring to FIG. 1, the engine system 10 also includes an engine controller 50 in operative communication with the engine 12 through lines 52, 54. The engine controller controls the spark timing of the spark plugs and/or the operation of the fuel injectors as set forth in detail below. The clock 13 is utilized in activating and deactivating the torque management system of the present invention is implemented in the engine controller. In addition, the engine controller has an associated memory 56, such as a read only memory (ROM), a random access memory (RAM), or any other type of conventional computer memory. The engine controller also includes signal processing 58 for conditioning signals received from a throttle position sensor 59 and other parts of the engine control system.

The system also includes a transmission controller 60 that controls the transmission 26 through two groups of lines 62, 64. The lines 62 control the transmission shifting through solenoids that apply and vent oil to and from the clutches. The lines 64 receive signals sensed by transmission sensors, indicated generally at 65 and including a turbine speed sensor 68, an output shaft speed sensor 69, a shift lever position sensor 70, and clutch pressure switches including an input clutch sensor 80 and a reaction clutch sensor 81, to the controller 60. The transmission controller 60 includes circuitry 66 for reading the signals from the throttle position sensor 59, a crankshaft position sensor 67, the transmission sensors 65, and for converting the analog signals to digital signals for processing. The transmission controller communicates signals to the engine controller 50 through a signal link shown generally at 72.

With continued reference to FIG. 1 throughout the specification, implementation and operation of the torque management system of the present invention will now be described. The torque management system of the present invention includes implementation at the engine controller 50 to control engine torque, and thus the speed of the engine crankshaft 20 and the torque converter impeller 32, during shifts of the shift lever 34 through the transmission Neutral mode. As described in more detail below, the torque management system of the present invention utilizes data input from the engine controller clock 13, and the sensors 59, 65 and 67, to control engine torque output when: (1) the shift lever position sensor senses that the shift lever position is shifted into a Neutral mode and remains in the Neutral mode for less than a predetermined time period, which is typically from one to two seconds; and (2) the throttle sensor senses that the throttle angle is greater than a predetermined programmable level above zero. The above described rock cycle typically occurs when the motor vehicle operator quickly shifts between Reverse and Drive modes, such as during icy or muddy conditions when the wheels are not in good frictional contact with the ground surface.

The torque management system of the present invention is also activated under conditions such as a Neutral dump mode, when a motor vehicle operator depresses the accelerator pedal 19, thereby increasing the throttle angle when the transmission is in a Neutral mode, and then abruptly shifts the transmission into a Reverse or Drive mode.

In general, the torque management system is activated whenever the motor vehicle transmission is shifted from a Park, Reverse or Drive mode through Neutral, thereby allowing the engine, and thus the crankshaft and the impeller, to race at a high rpm level on disengagement of the clutch or clutches, either 38 or 42, from the driveline, thereby allowing the turbine 30 to accelerate to close to the speed of the impeller 32.

During the occurrence of a shift, the rotational speed of the turbine 30 will be reduced as the input and/or reaction clutches are engaged as the shift lever 34 is shifted from Neutral into the Drive or Reverse mode. Upon engagement of the clutch components, the reduction in speed of the turbine represents energy which is dissipated in the applying clutch. The applying clutch, either 38 or 42, dissipates this energy in the form of heat upon engagement. As a result, a great deal of stress is put on the input clutches 38, the reaction clutch 42, the driveshaft 24, the differential 44, and the wheels 22 during this engagement of the clutch components.

The torque management system of the present invention reduces the overall stress on the aforementioned driveline components during garage shifts by reducing engine speed during shifts through Neutral, when engine speed would otherwise be greatly increased. The engine speed is limited for a predetermined time period or until certain conditions occur subsequent to a shift out of Neutral into either a Reverse or a Drive mode, thus allowing the clutch fluid circuit to be filled to full volume and the clutch pressure to increase to an operational level before the torque management function is terminated.

Figure 2:
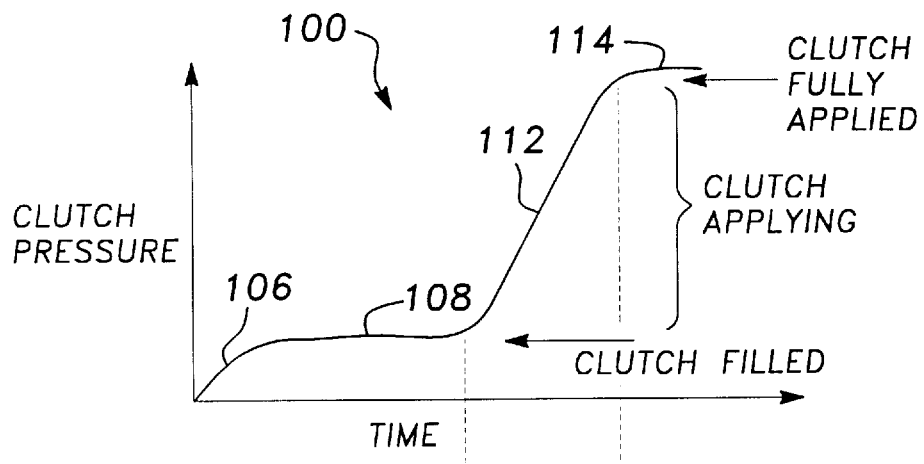
FIG. 2 graphically illustrates transmission system clutch pressure versus time for a conventional motor vehicle transmission clutch assembly.
Figure 3:
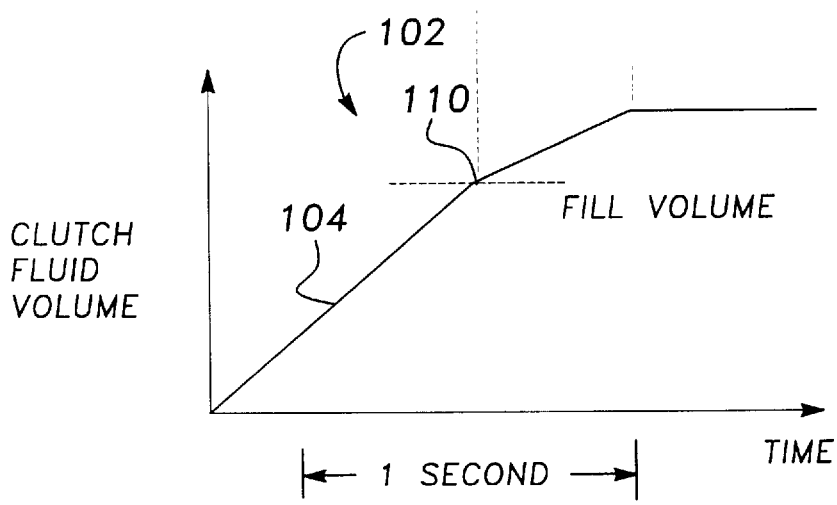
FIG. 3 graphically illustrates clutch circuit fluid volume versus time for a conventional motor vehicle transmission clutch assembly.

Correspondingly, as shown in FIGS. 2 and 3, graphs of clutch pressure versus time and clutch fluid volume versus time are shown at 100 and 102, respectively, for a conventional motor vehicle transmission clutch assembly. As shown at 104 and 106, clutch fluid volume and pressure increase upon application of the clutch. As shown at 108, the clutch subsequently reaches a steady state return spring pressure level as the clutch piston moves through clutch clearance to a clutch fluid fill volume position shown at 110. Subsequent to the piston being moved to its fill position at 110, the pressure of the clutch increases, as indicated at 112, until the clutch apply pressure is increased to a fully-applied condition, as indicated at 114. The torque management system of the present invention, upon sensing a shift through or from a Neutral mode, limits engine speed for the shift through Neutral mode time period and for a predetermined time or until certain events occur after the transmission is shifted out of the Neutral mode. This period corresponds to the period necessary for the clutch piston to stroke through the clearance and begin to develop torque, as shown at 112 in FIG. 2, to thereby minimize overall stress on motor vehicle driveline components caused by high energy dissipation.

Figure 4:
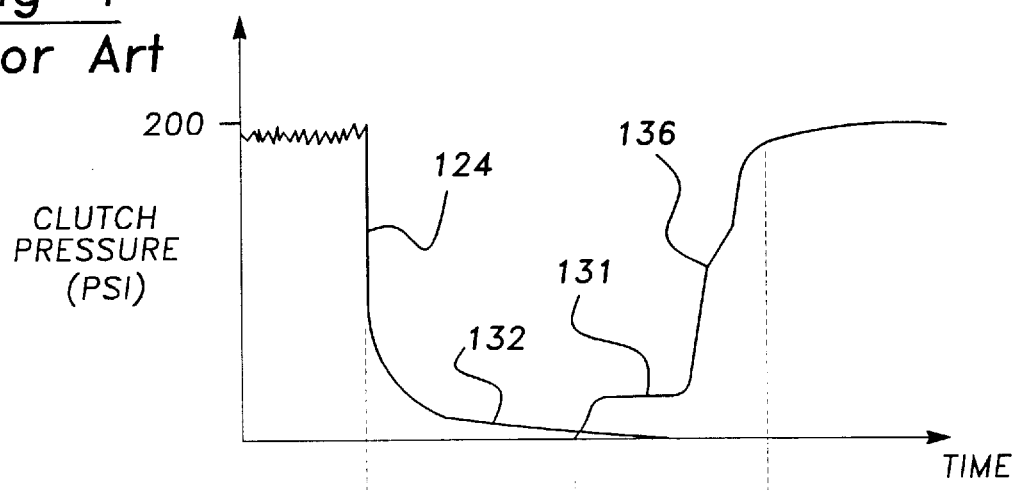
FIG. 4 graphically illustrates clutch pressure versus time for a prior art engine system not including a torque management system of the present invention.
Figure 5:
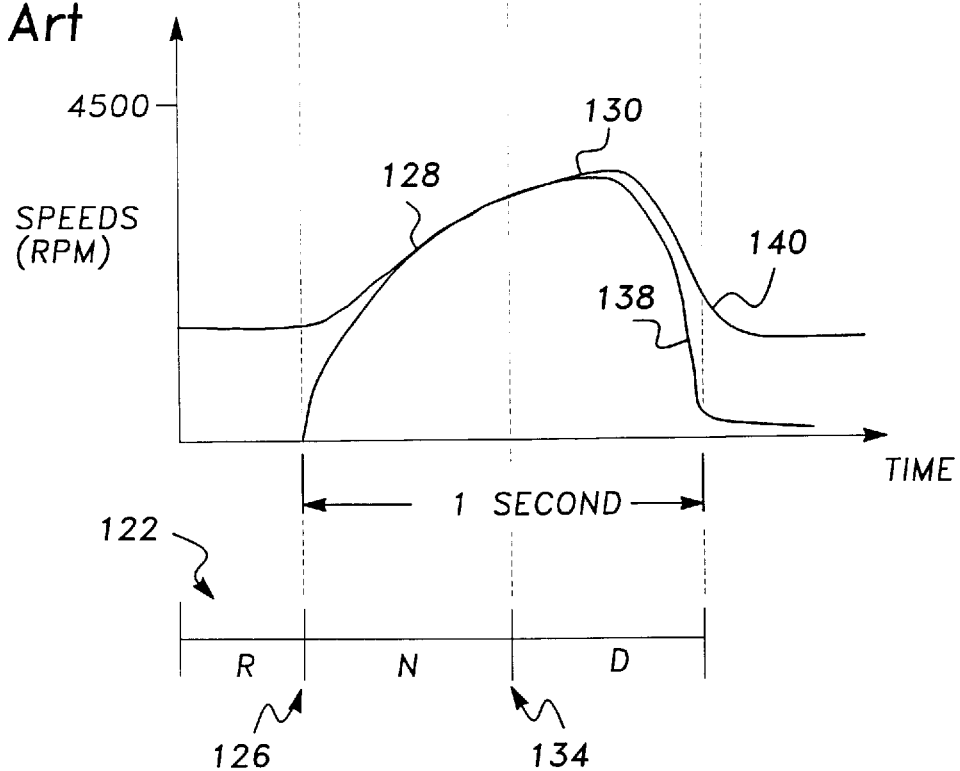
FIG. 5 graphically illustrates the engine and turbine speed timing of a prior art engine system not including the torque management system of the present invention.

Reference will now be made to graphical data in FIGS. 4 and 5 representing a prior art engine transmission not including the torque management system of the present invention. As shown at 122, the transmission is in a Reverse mode. The engine speed is dependent on the throttle position and the torque converter, while the speed of the turbine 32, i.e. wheel speed, is zero. Correspondingly, the Reverse input clutch is applied and is at or near a maximum value, as indicated at 124.

Subsequently, as indicated at 126, the transmission is shifted into a Neutral mode. As a result, the Reverse input clutch pressure is released, allowing first the turbine speed and thereby the engine speed to increase, as indicated at 128, as both reach a speed of approximately 4500 RPM at specific throttle valve angle as indicated at 130, before application of the forward input clutch at 131 prevents further increases in speed. The reverse clutch, when it releases at 124, drops to a pressure level corresponding to the return spring force as indicated at 132; as the transmission is shifted from a Neutral mode to a Drive mode, indicated generally at 134, the forward input clutch is filled and applied at 136. The transmission input, or turbine speed, is pulled sharply to zero, as indicated at 138, as the pressure of the applying forward input clutch increases. As the forward input clutch is engaged, it pulls down the turbine speed at 128, and thereby the engine speed at 140 to a normal engaged condition for the "Drive" mode.

The engagement of the applying forward input clutch generates a large amount of heat due to the friction resulting from the removal of kinetic energy from the engine and torque converter. This heat is dissipated by the clutch. Additionally, stress is placed both on the clutch and the associated drivetrain components during this initial engagement, as the clutch must use a high torque to bring the speeds down to the much lower RPM Drive mode state.

Referring to FIGS. 6 and 7, operation of the engine system 10, including the torque management system of the present invention will now be described. The graphical data in FIG. 6 is exemplary for a torque management system implemented solely within the engine controller 50. At 152, the transmission is shifted from a Reverse mode to a Neutral mode. The reverse input clutch is thereby released, and the clutch fluid volume decays, as indicated at 156. As the transmission is shifted into the Neutral mode with throttle and/or engine speed above predetermined levels, the engine controller 50 decreases engine torque output by retarding ignition timing to a programmed level and/or by shutting off a programmable number of fuel injectors.

As indicated generally at 158, the engine speed therefore does not increase as dramatically as with an engine without the torque management system of the present invention. The engine speed, along with the turbine speed, therefore increase slowly up to approximately 2700 RPM, as shown at 160, at same throttle valve angle as shown at 128 and 130 in FIG. 5 when engagement of the forward applying clutch at 164 prevents further increase. The transmission is then shifted from a Neutral mode to a Drive mode, as indicated at 162. After the transmission is shifted from Reverse to Neutral with throttle and/or engine speed above a predetermined value, the engine controller 50 controls the engine output torque as described above until a predetermined time or predetermined conditions have occurred which indicate that the forward applying clutch should be engaging. Once these predetermined conditions are realized, the torque management system deactivates, and the clutch engages as indicated at 166. With the lower engine speed associated with clutch re-engagement, drivetrain component strain is reduced and clutch wear is minimized.

It should be appreciated that the torque management system is also operative during a shift through Neutral from a Drive to a Reverse mode in a manner similar to that described above for a shift through Neutral from a Reverse mode to a Drive mode.

Referring now to FIGS. 6–8, graphical analysis of an engine system in which the torque management system of the present invention that utilizes both the engine controller 50 and the transmission controller 60 will be described. As the transmission is shifted from a Reverse (or Drive) mode to a Neutral mode at 152, the transmission controller 60 senses this change and generates a digital start pulse shown at 180 in FIG. 8. This digital start pulse is communicated at 72 (FIG. 1) to the engine controller 50, thereby identifying the exact point in time in which the Neutral mode transition occurred. Subsequently, upon the calculated clutch volumes reaching predetermined levels (other parameters may be used along with or in place of clutch volume), the transmission generates an end pulse, shown at 182, which is communicated to the engine controller 50. The engine controller thus can determine the exact point in time in which full engine power should be restored. With this additional information from the transmission controller 60, the engine controller 50 can more precisely determine the points in time in which the torque management system of the present invention should be activated and subsequently deactivated to minimize stress on transmission driveline components. Preferably, the digital start pulse and the end pulse are as short as reliably achievable. However, these signals, along with the time period between, may vary according to the particular engine and transmission in which the torque management system of the present invention is implemented in accordance with well known software programming procedures.

Figure 9:
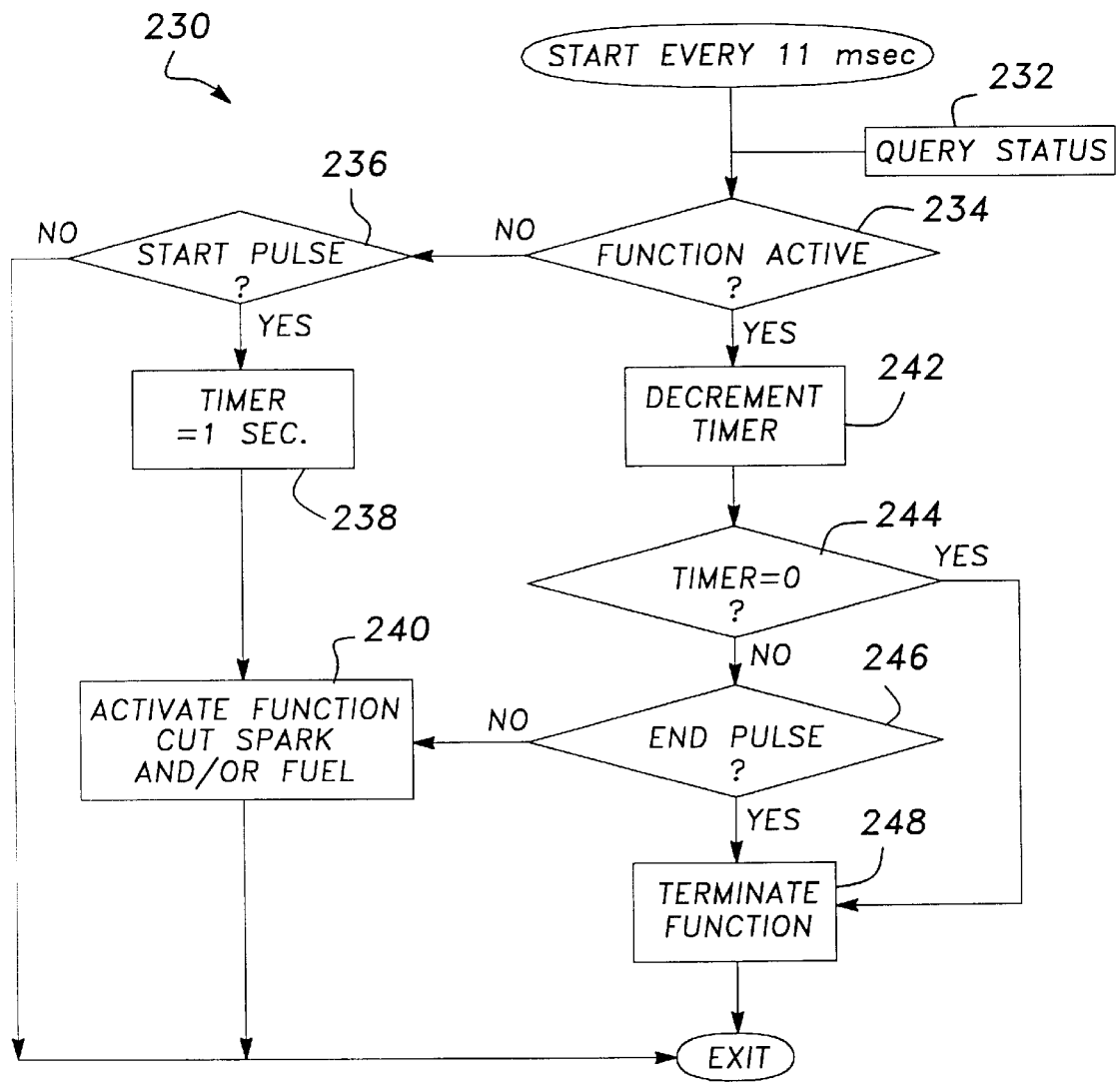
FIG. 9 is a flow diagram illustrating the methodology of the engine controller torque management system of the present invention utilizing transmission controller.
Figure 10:
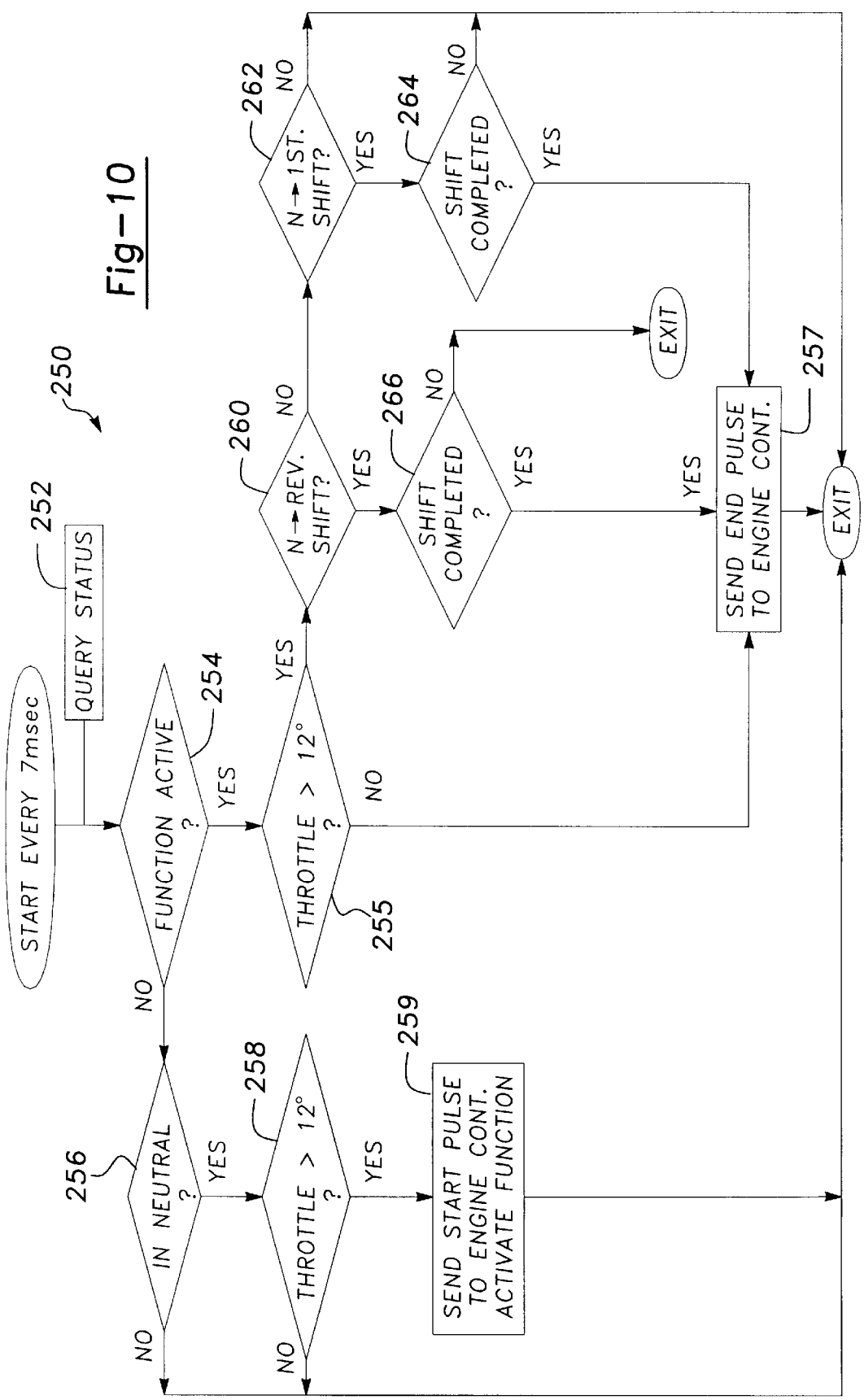
FIG. 10 is a flow diagram illustrating the methodology implemented by the torque management system of the transmission controller.

Referring now to FIG. 9, a flow diagram showing the methodology associated with the torque management system of the present invention with transmission related data from the transmission controller 60 is shown generally at 230. FIGS. 9 and 10 together describe the logic of the preferred embodiment. At step 232, the methodology queries the status of the torque management system. At step 234, the methodology, determines if the torque management function has been activated. At step 236, if the function is not activated, the methodology determines if the start pulse was received from the transmission controller. The methodology ends if it is determined that the start pulse was not received. However, if the methodology determines that the start pulse was received, it advances to step 238 and sets the engine timer equal to a programmed predetermined length of time, which is preferably one second. Subsequently, at step 240, the torque management system is activated to inhibit spark advance and/or the fuel injectors to decrease engine speed for the programmed predetermined length of time. Subsequent to inhibiting the engine speed for the programmed amount of time, as determined by a timer implemented at the engine controller, the methodology ends.

Returning to step 234, if the methodology determines that the function is activated, the timer is decremented at step 242. Subsequently, at step 244, the methodology determines if the timer has expired. If it has, the function is terminated. If the timer has not expired, the methodology determines if an end pulse was received at step 246. If it is determined that the end pulse was not received, the torque management system is activated and the spark advance and/or the fuel injectors are inhibited at step 240. However, if it is determined that the end pulse was received, the function is terminated at step 248.

Referring now to FIG. 10, the methodology for the torque management system of the present invention utilizing transmission data in the transmission controller 60 is shown generally at 250. At step 252, the methodology periodically queries to determine the status of the torque management system, preferably about every seven milliseconds. If the methodology determines that the function is not activated at step 254, the methodology advances to step 256 and determines whether the transmission is in a Neutral mode. If the transmission is not in a Neutral mode, the methodology ends. However, if the transmission is in a Neutral mode, the methodology advances to step 258 where it is determined if the throttle sensor 59 senses that the throttle 18 is depressed at a predetermined angle, such as an angle greater than 12 degrees. If the throttle is not in such a position, the methodology ends. However, if the throttle is in a position greater than 12 degrees, a start pulse is sent to the engine controller 50 at step 259 and the methodology ends until the torque management system is deactivated as will now be described.

Returning to step 254, if it is determined that the system is activated, the methodology advances to step 255 to determine whether the throttle is depressed at an angle greater than 12 degrees. If the throttle is not in such a position, the methodology advances to step 257 and an end pulse is sent to the engine controller 50 to end the torque management system cycle. However, if the throttle is in a position greater than 12 degrees, the methodology advances to step 260 to determine if there has been a Neutral to Reverse mode shift. If a Neutral to Reverse mode shift has not occurred, the methodology advances to step 262 to determine if there has been a Neutral to Drive mode shift. If no such shift has occurred, the cycle ends until the next query. However, if such a shift has occurred, the methodology advances to step 264 to determine if the shift is completed. Completion of shift can be determined by one or a combination of the following: (1) clutch fluid volume achieves a predetermined value; (2) turbine speed reaches a predetermined value; or (3) turbine acceleration reaches a predetermined value. If it is not completed, the cycle ends until the next query. However, if the applying clutch has been filled, an end pulse is sent to the engine controller 50 at step 257 and the cycle ends.

Returning to step 260, if the methodology determines that a Neutral to Reverse mode shift has occurred, the methodology advances to step 266 to determine if the shift is completed. If it is not completed, the cycle ends until the next query. However, if the shift is completed, the methodology advances to step 257 and an end pulse is sent to the engine controller to de-activate the torque management system.

Figure 11:
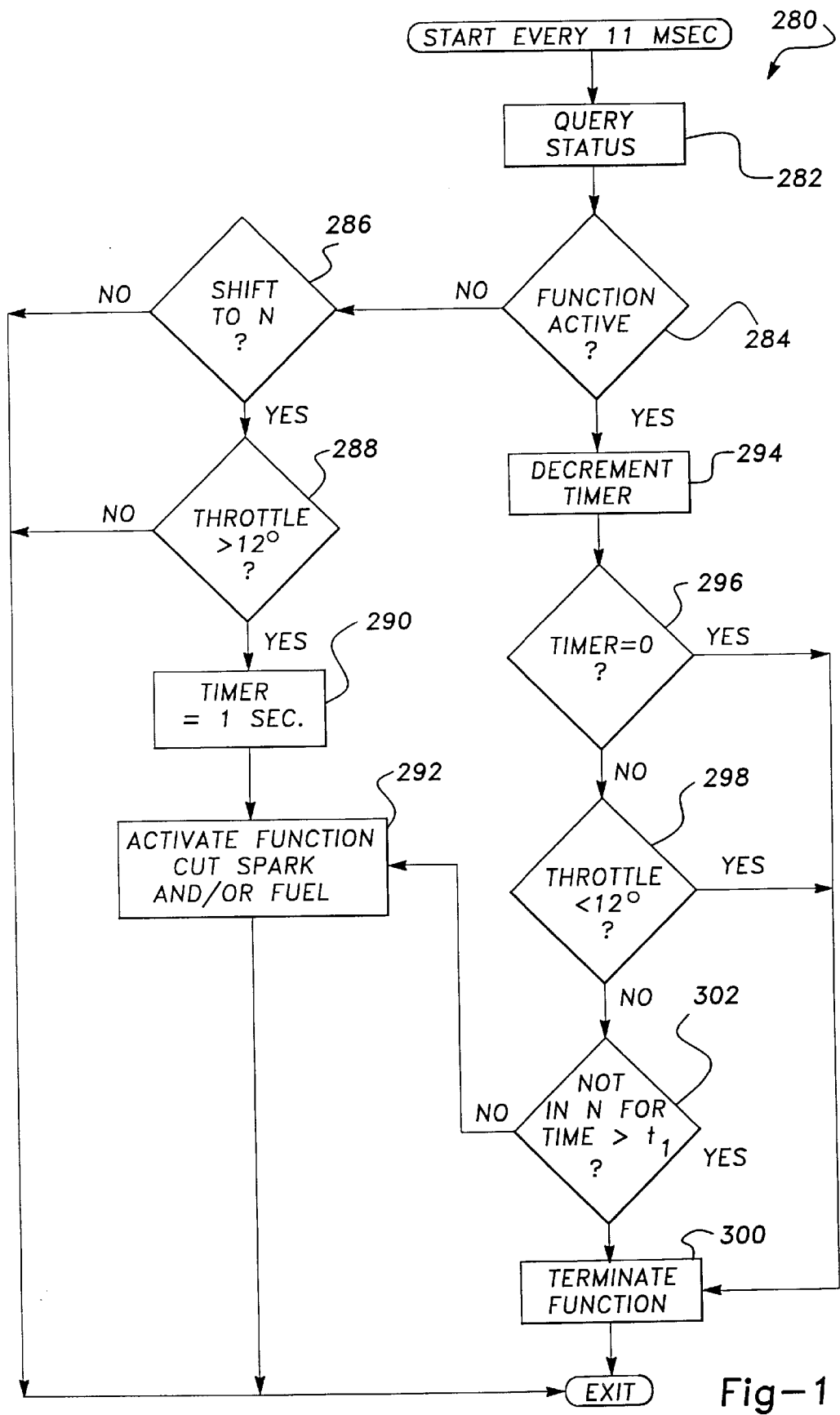
FIG. 11 is a flow diagram illustrating an alternate methodology of the engine controller torque management system of the present invention not utilizing transmission controller data.

Referring to FIG. 11, a flow diagram illustrating an alternative methodology for the torque management system of the present invention that does not utilize transmission related data from the transmission controller 60 is shown generally at 280. At step 282, the methodology queries the status of the system. At step 284, the methodology determines if the torque management function has been activated. At step 286, if the function is not activated, the methodology determines if a shift to the Neutral mode has been performed. If the transmission has been shifted into the Neutral mode, the methodology advances to step 288 where it is determined if the throttle sensor 59 senses that the throttle 18 is depressed at an angle greater than 12 degrees. If the throttle is not in such a position, the methodology ends. However, if the throttle is in a position greater than the 12 degrees, the methodology sets the engine timer equal to a programmed predetermined length of time, which is preferably one second, as indicated at 290. Subsequently, at step 292, the torque management system is activated to inhibit spark advance and/or the fuel injectors to decrease engine speed for the programmed predetermined length of time. Subsequent to inhibiting the engine speed for the programmed amount of time, the methodology ends. Returning to step 284, the methodology determines that the function is activated, the timer is decremented at step 294. Subsequently at step 296, the methodology determines if the timer has expired. If it has, the function is terminated. If the timer has not expired, however, the methodology determines at step 298 if the throttle is depressed at an angle less than a predetermined angle, such as 12 degrees. If the throttle is depressed at an angle less that the predetermined angle, the torque management function is terminated at step 300. However, if the throttle is depressed at an angle greater than the predetermined angle, the methodology advances to step 302, where it is determined if the transmission does not remain in a Neutral mode for a predetermined time period $t_1$. If the transmission does not remain in Neutral for this predetermined time period, the torque management function is terminated at step 300. However, if the transmission remains in a Neutral mode for a length of time greater than $t_1$, the torque management system inhibits spark advance and/or the fuel injectors to decrease engine speed for the programmed predetermined length of time at step 292.

As can be appreciated from the foregoing description, the torque management system of the present invention provides for effective control of engine speed during garage shifts, and thereby minimizes stress on associated driveline components. The torque management system of the present invention, when implemented in a motor vehicle, thereby increases the life of the transmission components, provide smoother operation during rocking maneuvers, and aids in minimizing associated transmission repair costs over the life of the motor vehicle.

While the above detailed description describes the preferred embodiment of the present invention, the invention is susceptible to modification, variation and alteration without deviating from the scope and fair meaning of the subjoined claims.

What is claimed is:

1. A shaft system for a spark ignited internal combustion engine with an automatic transmission, comprising:

a torque converter including an impeller in operative engagement with said engine and a turbine for transferring torque from said impeller to said transmission;

a clutch mechanism for selectively connecting said torque converter with said transmission, said clutch mechanism engaging during Drive and Reverse modes and disengaging during a Neutral mode;

a means for sensing transition of said transmission into said Neutral mode;

a throttle position sensor for determining a throttle angle; and an engine controller in operative connection with said means for sensing transition of said transmission into said Neutral mode and said throttle position sensor for reducing an engine speed upon shifting of said transmission through said Neutral mode when said throttle angle is at a predetermined throttle angle.

2. The system of claim 1, wherein said means for sensing transition of said transmission into said Neutral mode comprises a clutch mechanism sensor for sensing engagement and disengagement of said clutch mechanism.

3. The system of claim 1, further comprising a transmission controller in operative communication with said engine controller for transmitting sensed transmission conditions to said engine controller for engine fuel and timing control purposes.

4. The system of claim 3, wherein said transmission controller generates digital pulses for activating and deactivating said engine controller to optimize engine output control.

5. The system of claim 3, further comprising a clutch pressure switch operatively connected to said transmission controller for sensing a fluid volume associated with said clutch mechanism becoming filled to a predetermined level.

6. The system of claim 3, further comprising a means operatively connected to said transmission controller for sensing that said transmission has been shifted from said Neutral mode to said Reverse mode for a predetermined time.

7. The system of claim 3, further comprising a speed sensor operatively connected to said transmission controller for sensing speed and acceleration of said turbine to a programmable level.

8. The system of claim 3, further comprising a shift lever position sensor operatively connected to said transmission controller for sensing shifting of said transmission through said Neutral mode.

9. The system of claim 3, further comprising a means for sensing that said transmission has been shifted from said Neutral mode to said Drive mode for a predetermined time.

10. The system of claim 1, further comprising a timer implemented at said engine controller for indicating when said engine speed should be returned to a normal throttle speed.

11. A torque management apparatus for an internal combustion engine with an automatic transmission comprising:

a sensor for sensing shifting of said transmission to a Neutral mode for a predetermined time interval;

a means for determining a throttle angle;

engine limiting means operatively connected to said sensor and said means for determining a throttle angle for limiting speed of said engine in response to said sensor sensing shifting of said transmission into said Neutral mode for said predetermined time interval when said throttle angle is at a predetermined throttle angle; and engine delimiting means operatively connected to said sensor and to said engine limiting means for returning said engine to a normal throttle speed in response to shifting of said transmission out of said Neutral mode;

said engine limiting means and said engine delimiting means minimizing stress on said transmission due to engagement and disengagement of transmission components caused by shifting of said transmission into a Reverse or Drive condition from a condition of high engine speed.

12. The torque management apparatus of claim 11, further comprising control means for generating an end of shift cycle signal to said engine delimiting means.

13. The torque management apparatus of claim 12, wherein said control means comprises an engine controller having an associated timer for causing said engine delimiting means to return said engine to said normal throttle speed after a predetermined period of time has elapsed.

14. The torque management apparatus of claim 12, wherein said control means comprises a transmission controller for providing feedback from said transmission to said engine delimiting means to return said speed of said engine to normal throttle speed upon sensing of predetermined transmission conditions.

15. A method for reducing stress on driveline components of a motor vehicle having an internal combustion spark ignited engine and an automatic transmission including a torque converter, a driveshaft driven by said torque converter, and a clutch mechanism for selectively engaging said driveshaft with said torque converter, said method comprising the steps of:

detecting a transmission shift to a Neutral mode;

determining if an engine throttle is engaged at greater than a predetermined angle;

inhibiting engine output if said engine throttle is engaged at greater than said predetermined angle by reducing rotational speed of said torque converter to minimize generated heat that must be dissipated by said clutch upon re-engagement of said clutch with said torque converter; and upon sensing subsequent engagement of said clutch, returning said engine to normal operation.

16. The method of claim 15, wherein said step of inhibiting said engine output comprises reducing engine spark advance.

17. The method of claim 15, wherein said step of inhibiting said engine output comprises inhibiting operation of engine fuel injectors.

18. The method of claim 15, further comprising the step of inhibiting said engine output if said engine remains in said Neutral mode for a predetermined time and an engine throttle is engaged at an angle greater than a predetermined angle.

* * * * *